(12) United States Patent
Kaneko et al.

(10) Patent No.: US 6,560,040 B2
(45) Date of Patent: May 6, 2003

(54) IMAGE PICKUP LENS SYSTEM

(75) Inventors: Isamu Kaneko, Kawaguchi (JP); Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/876,302

(22) Filed: Jun. 6, 2001

(65) Prior Publication Data

US 2002/0075573 A1 Jun. 20, 2002

(30) Foreign Application Priority Data

Jun. 7, 2000 (JP) ........................................ 2000-170449

(51) Int. Cl.$^7$ ............................. G02B 9/08; G02B 7/02; G11B 7/00

(52) U.S. Cl. ...................... 359/739; 359/811; 359/819; 369/112.01

(58) Field of Search ................................ 359/738–740, 359/719, 811, 819; 369/112.01

(56) References Cited

U.S. PATENT DOCUMENTS 5,274,502 A * 12/1993 Demerritt et al. ........... 359/642
6,104,545 A * 8/2000 Tsuchida ..................... 359/738

* cited by examiner

Primary Examiner—Scott J. Sugarman
(74) Attorney, Agent, or Firm—Koda & Androlia

(57) ABSTRACT

An image pickup lens system according to the present invention includes a lens body having a positive power and a diaphragm which is unified with the lens body at a location between the first face and the second face of the lens body and of which inner cylindrical surface is disposed at a location of the inside of the lens body. Thus, the numbers of the elements of the image pickup lens system are decreased and the image pickup lens system can be produced accurately. Moreover, when the lens body and the diaphragm are unified each other, both optical axes of the lens body and the diaphragm can be very accurately adjusted and automatically adjusted. Thus, a work to adjust accurately those optical axes is not necessary so that the lens body and the diaphragm can be produced easily and speedy. Moreover, by disposing the actual diaphragm, this invention can prevent the occurrence of the stray light such a flare and a ghost and the like and can actually remove the stray light if it occurs.

11 Claims, 9 Drawing Sheets

PRIOR ART

IMAGE PICKUP LENS SYSTEM

BACKGROUND OF THE INVENTION

The present invention relates to an image pickup lens system and particularly, to an image pickup lens system which is comprised of one lens and used in an image pick-up device (e.g., an image-inputting CCD camera) utilizing a solid image-pickup element such as CCD, CMOS and the like mounted on a potable computer, a visual telephone and the like, and which can ensure a wider angle of view and can be reduced in size and weight.

DESCRIPTION OF THE RELATED ART

In recent years, multimedia have been developed remarkably, and for example, the demand for a camera utilizing a solid image-pickup element such as CCD, CMOS and the like, e.g., a CCD camera, mounted on a portable computer, a visual telephone and the like, is being increased remarkably. Such a CCD camera is required to be mounted in a limited space and for this reason, it is desired that the CCD camera is small in size and lightweight.

Therefore, it is also desired that an image pickup lens system used in such a CCD camera is likewise small in size and lightweight.

A one-lens system using a single lens is conventionally used as such an image pickup lens system.

FIG. 1 shows a prior art of a one-lens system using a single lens. This one-lens system comprises a lens body 15 having a first face formed as a convex face and a second face formed as a convex face and has a positive power. The lens body 15 is put in position at inside part of one end of a lens barrel 16. A diaphragm 17 expanding inwardly from the lens barrel 16 is disposed at the one end of the cylinder 16 and holds the lens body 15 by putting it between the diaphragm 17 and a press member 18 disposed at a location on a rear side of the lens body 15.

Moreover, as showing in FIG. 2, an image-pickup circuit 20 having an image-pickup element 19 such as CCD, CMOS and the like, is put in position at a location of the second face of the lens body 15 by adjusting an optical axis 21 of the lens body 15 and an optical axis 22 of the image-pickup element 19.

However, as showing in FIG. 2, the conventional image pickup lens system of such arrangement suffers from the following problems: When the lens body 15 inserts in the lens barrel 16, it is necessary to adjust an optical axis 23 of both of the lens barrel 16 and the diaphragm 17 and the optical axis 21 of the lens body 15. Accordingly, a very high accuracy of assembling and so much long assembling time are necessary and the manufacture cost is increased. If the accuracy of the adjusting optical axes is deteriorated, a desired optical performance of lens is also deteriorated.

To solve such problems, some image pickup lens systems disclosed, for example, in Japanese Patent Application Laid-open Nos.6-250083 and 5-273461.

Any of these image pickup lens systems disclosed in the above Patent Applications is comprised of a lens body and a circular groove which is formed at a location of the center of the optical axis direction of the outer cylindrical surface of the lens body, has a wedge shape section and works as a diaphragm.

However, any of such conventional image pickup lens systems suffers from a problem that F number of the lens system is more than 10 so that the lens system is very dark.

The image pickup lens systems disclosed in Japanese Patent Application Laid-open No.6-250083 is used in a document reader device such as a scanner and the like, and the image pickup lens systems disclosed in Japanese Patent Application Laid-open No.5-273461 is used in a film with a lens, and these conventional image pickup lens systems can be applied to the document reader device and the film with a lens without any problem, but they can not be applied to a potable computer, a visual telephone, a cellular phone and the like, because these conventional systems are too dark.

Moreover, any of such conventional image pickup lens systems suffers from a problem that it is very difficult to lighten the lens system, because they consist of a lens body with a circular groove and they have no diaphragm. Moreover, they suffer from a problem that a stray light such as a flare and a ghost and the like easily occurs and this stray light is not eliminated completely. If a lens system becomes lighter, the problem of the occurrence of the stray light is more severe. Therefore, conventional image pickup lens systems are not used in a solid image-pickup element.

SUMMARY OF THE INVENTION

Accordingly, it is an object of the present invention to provide an image pickup lens system, in which the numbers of the elements of the image pickup lens system are decreased, which can be produced easily and speedy, and in which a optical performance concerning the image pickup lens system is increased.

To achieve the above object, according to the present invention, there is provided an image pickup lens system comprising a lens body having a positive power and a diaphragm which is unified with the lens body at a location between the first face and the second face of the lens body and of which inner cylindrical surface is put in position at a location of the inside of the lens body.

With the above feature, the lens body and the diaphragm are unified each other. Thus, the numbers of the elements of the image pickup lens system are decreased and the image pickup lens system can be produced accurately. Moreover, when the lens body and the diaphragm are unified each other, both optical axes of the lens body and the diaphragm can be very accurately adjusted and automatically adjusted. Thus, a work to adjust accurately those optical axes is not necessary so that the lens body and the diaphragm can be produced easily and speedy. Moreover, by disposing the actual diaphragm, this invention can prevent the occurrence of the stray light such a flare and a ghost and the like and can actually remove the stray light if it occurs.

According to another present invention, there is provided an image pickup lens system comprising the diaphragm is unified with a lens barrel.

With the above feature, the diaphragm and the lens barrel are unified each other. Thus, the numbers of the elements of the image pickup lens system are more decreased and the image pickup lens system can be produced more easily and speedy.

According to another present invention, there is provided an image pickup lens system comprising the inner cylindrical surface of the diaphragm has an acute angle end at a location of the first face side portion or the second face side portion of the lens body.

With the above feature, the inner cylindrical surface of the diaphragm has an acute angle end at a location of the first face side portion or the second face side portion of the lens body. Thus, the diaphragm provides its appropriate function.

According to another present invention, the diaphragm is made of a material which has a similar or almost the same heat conductivity of the one of a molding die for molding the lens body.

With the above feature, the diaphragm is made of a material which has a similar or almost the same heat conductivity of the one of a molding die for molding the lens body. Thus, during a cooling step of the molding process of the lens body, both of the cooling temperature of the inner part and the outer part contacting with inner surface of a molding die of the lens body can be kept almost the same so that whole part of the lens body can be cooled almost uniformly. Therefore, a refractive index is kept uniformly in the whole inner part of the lens body without any unevenness so that a image pickup lens system having a stable optical performance can be provided.

According to another present invention, there is provided an image pickup lens system comprising the diaphragm has a light shade which extends from diaphragm to the first face of the lens body along the outer cylindrical surface of the lens body.

With the above feature, the diaphragm has the light shade which extends from diaphragm to the first face of the lens body along the outer cylindrical surface of the lens body. Thus, the light shade can remove an incident ray and a stray light on outer cylindrical surface of the lens.

DESCRIPTION OF THE PREFERRED EMBODIMENTS

The present invention will now be described by way of an embodiment with reference to FIGS. 3 to 14.

Figure 1:
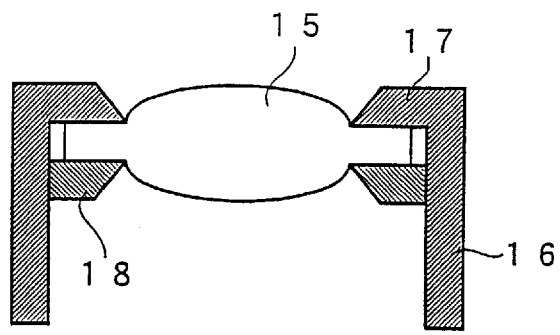
FIG. 1 is a schematic illustration of an arrangement of an image pickup lens system according to the prior art.
Figure 2:
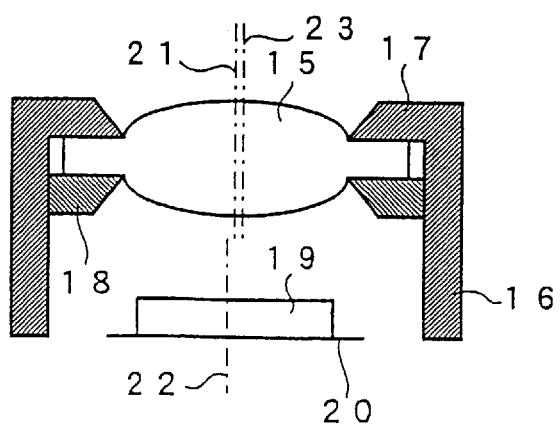
FIG. 2 is a schematic illustration showing an embodiment of an image pickup lens system put in an image-pickup circuit having an image-pickup element according to the prior art.

FIG. 1 shows a basic arrangement of an image pickup lens system according to the present invention. The image pickup lens system of the present embodiment comprises a lens body 1 which has a positive power and is made of a resin such as plastics and the like. The lens body 1 includes convex faces formed on the first face located adjacent the object and the second face located adjacent the image of the lens body and has a positive power. The first lens 1 may be a double convex lens, or a meniscus concave lens having a flat face or a concave face on the side of the first face.

Figure 3:
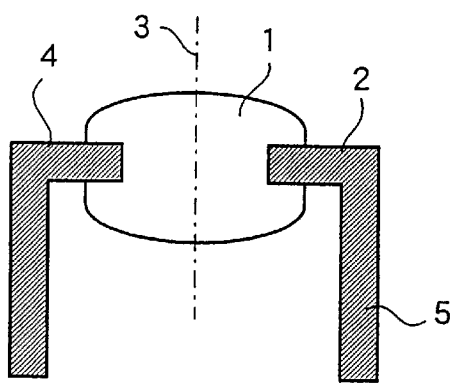
FIG. 3 is a schematic illustration of an embodiment of an image pickup lens system according to the present invention.

Further, a diaphragm 2 is unified with the lens body data location between the first face and the second face of the lens body 1 (in the middle of the optic axis direction of the outer surface of the lens body 1 shown in the FIG. 3) and a inner cylindrical surface thereof is disposed at a location of the inside of the lens body 1. In the present embodiment, in order to produce this lens body 1 having the diaphragm 2 unified therewith, the diaphragm 2 is put into a concave portion of a molding die for the lens body 1 at the first step, a melted resin is injected into the concave portion of the molding die at the next step, then the lens body 1 and the diaphragm 2 are unified with each other.

Further, in the present embodiment, as showing in FIG. 3, the diaphragm 4 has a ring orifice 4 crossing at right angle to the optic axis of the lens body 1 and a lens barrel 5 unified with the ring orifice 4 expanding from the outer end portion of the ring orifice 4 to the second face of the lens of the lens body 1 along an optic axis 3 of the lens body 1. A cylindrical inner surface of the diaphragm 2 (ring orifice 4) runs parallel to the axis 3.

Figure 4:
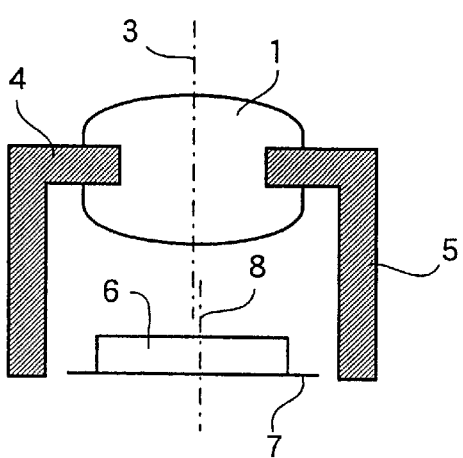
FIG. 4 is a schematic illustration showing the embodiment of an image pickup lens system shown in FIG. 3 put in an image-pickup circuit having an image-pickup element.

Moreover, as showing in FIG. 4, an image-pickup circuit 7 having an image-pickup element 6 such as CCD, CMOS and the like, is put in position at a location of the second face of the lens body 1 by adjusting the optical axis 3 of the lens body 1 and an optical axis 8 of the image-pickup element 6. Further, a cover glass (not shown) may be disposed between the second surface of the lens body 1 and the image-pickup circuit 7.

In the present embodiment, the lens body 1 and the diaphragm 2 are unified each other and the diaphragm 2 and the lens barrel 5 are unified each other. Thus, the numbers of the elements of the image pickup lens system are decreased and the image pickup lens system can be produced accurately, in comparison with the prior art disposing the lens body 1, the diaphragm 2 and the lens barrel 5. Moreover, when the lens body 1 and the diaphragm 2 are unified each other, both optical axes of the lens body and the diaphragm can be very accurately adjusted and automatically adjusted. Thus, a work to adjust accurately those optical axis as well as the prior art is not necessary so that the lens body 1 and the diaphragm 2 can be produced easily and speedy.

Moreover, by disposing the diaphragm 2, this invention can prevent the occurrence of the stray light such a flare and a ghost and the like and can actually remove the stray light if it occurs.

Further, the diaphragm 2 is made of a metallic material which has a similar or almost the same heat conductivity of the one of a molding die for molding the lens body. Thus, during a cooling step of the injection molding process of the lens body 1, both of the cooling temperature of the inner part and the outer part contacting with inner surface of a molding die of the lens body 1 can be kept almost the same so that whole part of the lens body 1 can be cooled almost uniformly. Therefore, a refractive index is kept uniformly in the whole inner part of the lens body 1 without any unevenness so that the image pickup lens system having a stable optical performance can be provided.

Therefore, in the present embodiment, the lens body 1 and the diaphragm 2 are unified each other so that the lens body 1 and the diaphragm 2 can be produced easily and speedy and the manufacture cost can be reduced. Moreover, in the present embodiment, the image pickup lens systems can become lighter as like as the F number of the lens system is 2.5, an optical performance concerning the image pickup lens system is increased, and the image pickup lens systems can be easy to use.

Figure 5:
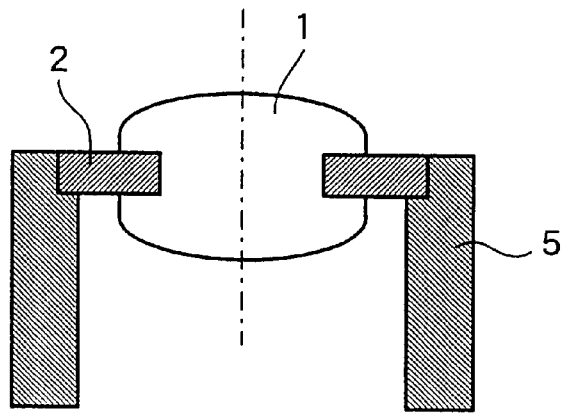
FIG. 5 is a schematic illustration showing another embodiment of an image pickup lens system according to the present invention.

FIG. 5 shows another embodiment of the present invention, in which the diaphragm 2 is formed a ring and unified with the lens body 1.

In the present embodiment, the diaphragm 2 of the lens body 1 is mounted on the end of the lens barrel 5. In order to easily and accurately assembling them, the diaphragm 2 has more than one groove (not shown) at the outer surface thereof and the lens barrel 5 has more than one projection engaging the groove at one end thereof.

Figure 6:
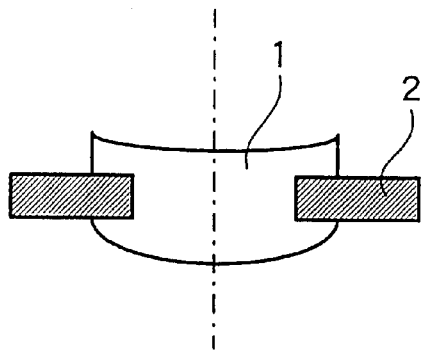
FIG. 6 is a schematic illustration showing an embodiment of a shape of an inner cylindrical surface of a diaphragm according to the present invention.
Figure 7:
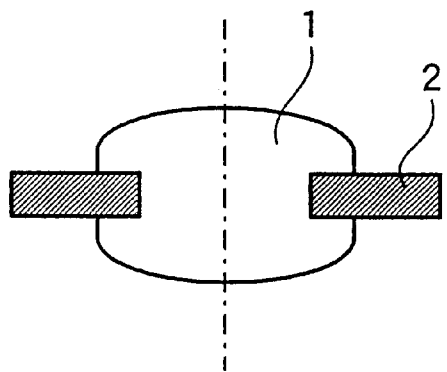
FIG. 7 is a schematic illustration showing another embodiment of a shape of an inner cylindrical surface of a diaphragm according to the present invention.

FIG. 6 and FIG. 7 show further another embodiment of the present invention, in which a cylindrical inner surface of the diaphragm 2 runs parallel with the optic axis 3. The lens body 1 includes a meniscus concave lens having one concave face with reference to FIG. 6. The lens body 1 includes double convex faces and has a positive power with reference to FIG. 7.

Figure 8:
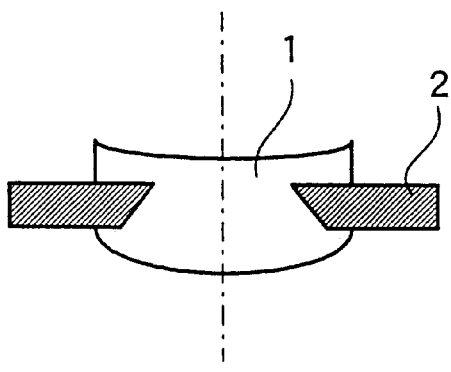
FIG. 8 is a schematic illustration showing further another embodiment of a shape of an inner cylindrical surface of a diaphragm according to the present invention.
Figure 9:
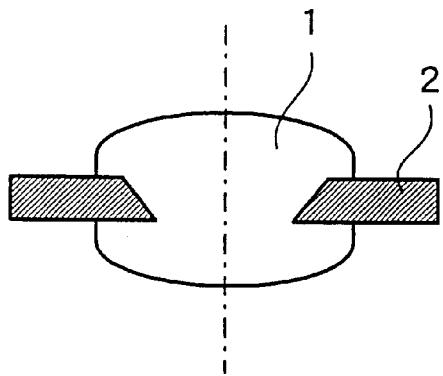
FIG. 9 is a schematic illustration showing further another embodiment of a shape of an inner cylindrical surface of a diaphragm according to the present invention.

Moreover, as showing in FIG. 8, in the lens body 1 including a meniscus concave lens having a positive power and one concave face at a location of the object side portion, the inner cylindrical surface of the diaphragm 2 has a slope making an acute angle end at a location of the object side portion thereof. As showing in FIG. 9, in the lens body 1 including a double convex lens having a positive power, the inner cylindrical surface of the diaphragm 2 has a slope making an acute angle end at a location of the image-pickup circuit 7 thereof.

Figure 10:
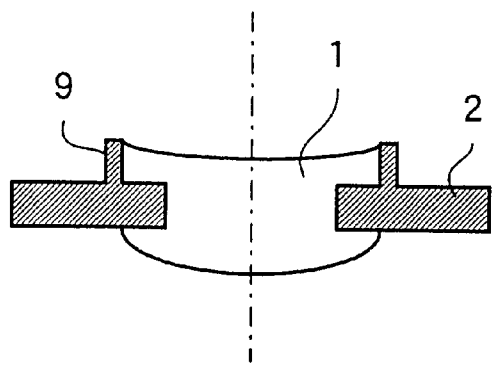
FIG. 10 is a schematic illustration showing another embodiment of an image pickup lens system having diaphragm with a light shade according to the present invention.
Figure 11:
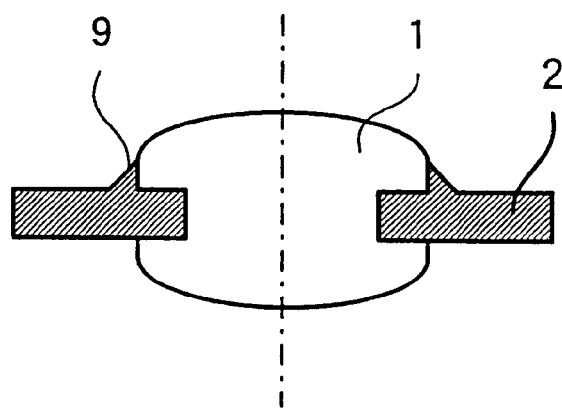
FIG. 11 is a schematic illustration showing further another embodiment of an image pickup lens system having diaphragm with a light shade according to the present invention.

Moreover, as showing in FIG. 10, in the lens body 1 including a meniscus concave lens having a positive power and one concave face at a location of the object side portion, the diaphragm 2 unified with the lens body 1 has a light shade 9 which extends from the diaphragm 2 to the end at a location of the object side portion of the lens body 1 along the outer cylindrical surface of the lens body 1. Thus, the light shade 9 can remove an incident ray and a stray light on outer cylindrical surface of the lens body 1. Moreover, as showing in FIG. 11, in the lens body 1 including a double convex lens having a positive power, the diaphragm 2 unified with the lens body 1 has a light shade 9 which extends from the diaphragm 2 to the end at a location of the object side portion of the lens body 1 along the outer cylindrical surface of the lens body 1.

With the above every diaphragm 2, the image pickup lens system of this invention can be produced easily and speedy, and in which a optical performance concerning the image pickup lens system is increased.

EXAMPLES

Examples of the present invention will now be described with reference to FIGS. 12 to 14.

In Examples described below, if a Z-axis is taken in a direction of an optical axis; an X-axis is taken in a direction perpendicular to the optical axis; and the direction of travel of light is defined to be positive, the a spherical shape of the lens is represented by the following expression $$Z = \frac{\frac{x^2}{r}}{1 + \sqrt{1-(k+1)\frac{x^2}{r^2}}} + ax^4 + bx^6 + cx^8 + dx^{10}$$

wherein each of k, a, b, c and d is an a spherical factor.

Example 1

Figure 12:
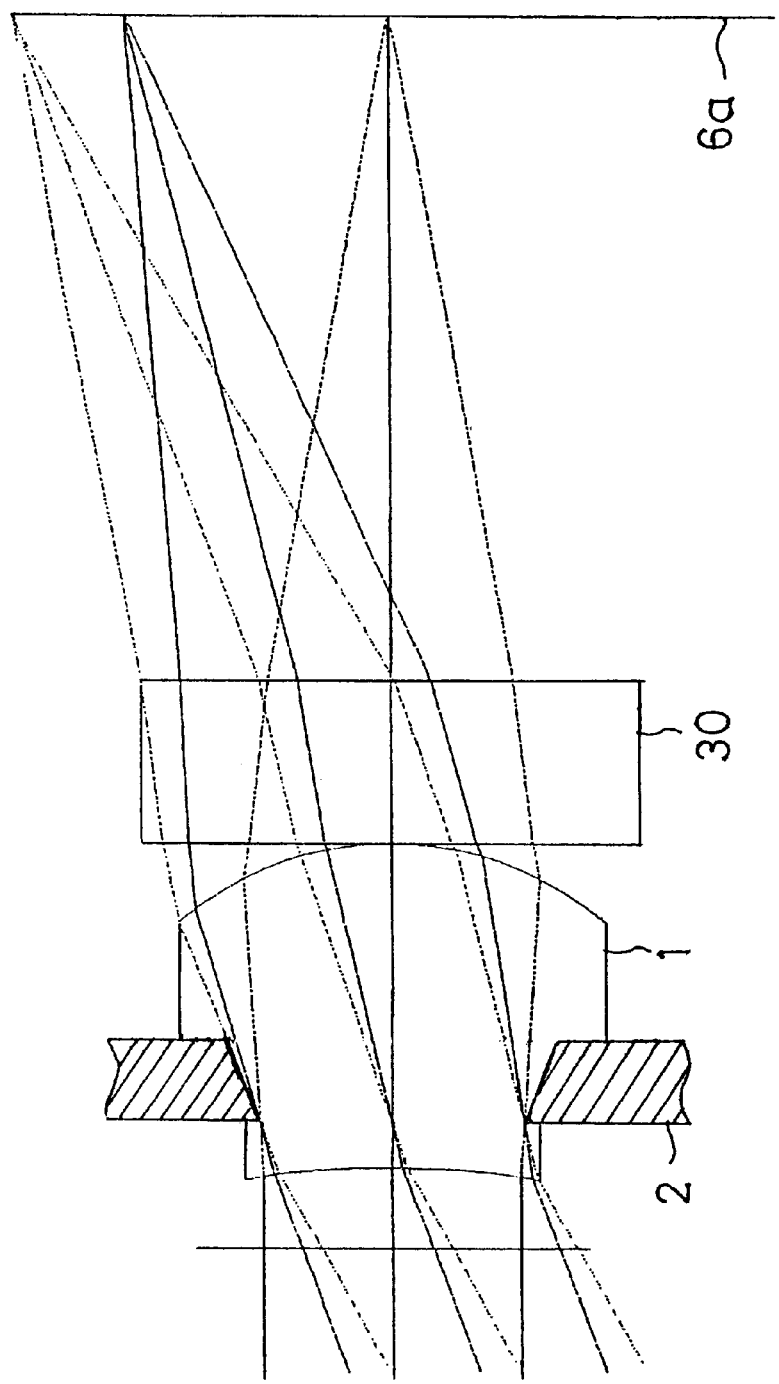
FIG. 12 is a schematic illustration showing Example 1 of an image pickup lens system according to the present invention.

FIG. 12 shows Example 1 of the present invention, which is an image pickup lens system having the lens body 1 including a meniscus concave lens having a positive power and one concave face at a location of the object side portion, the inner cylindrical surface of the diaphragm 2 has a slope making an acute angle end at a location of the object side portion thereof. Moreover, a cover glass 30 is disposed at a location of the object side of the image-pickup element 6. Reference character 6a (shown in FIG. 10) designates an image pickup surface of the image-pickup element 6 (in the same manner in FIGS. 13 and 14.)

| Face | Radius r of curvature | Distance d | Refractive index nd | Abbe number νd |
|---|---|---|---|---|
| (1) Object | 0.000 | ∞ | | |
| (2) First face of lens body | −8.423 | 0.2700 | 1.51800 | 56.0 |
| (3) First face of diaphragm | 0.000 | 0.5000 | 1.51800 | 56.0 |
| (4) Second face of diaphragm | 0.000 | 1.23000 | 1.51800 | 56.0 |
| (5) Second face of lens body | −1.981 | 0.0000 | | |
| (6) First face of cover glass | 0.000 | 1.0000 | 1.51680 | 64.2 |
| (7) Second face of cover glass | 0.000 | 4.1770 | | |
| (8) CCD face | 0.000 | | | |

| Face | k | A | b |
|---|---|---|---|
| 2 | 0.000000e+000 | −8.118300e−002 | 2.585000e−001 |
| 5 | −1.361950e+000 | −1.830700e−002 | −4.229000e−003 |

| Face | C | d |
|---|---|---|
| 2 | −4.920100e−001 | 2.893100e+000 |
| 5 | 0.000000e+000 | 0.000000e+000 |

Under such conditions, the angle of view 2ω = 58.3 degrees and F number = 2.8 were established, thereby sufficient optical characteristics including a wide angle of view and a very high brightness can be provided.

Under such conditions, the angle of view 2ω=58.3 degrees and F number=2.8 were established, thereby sufficient optical characteristics including a wide angle of view and a very high brightness provided.

Example 2

Figure 13:
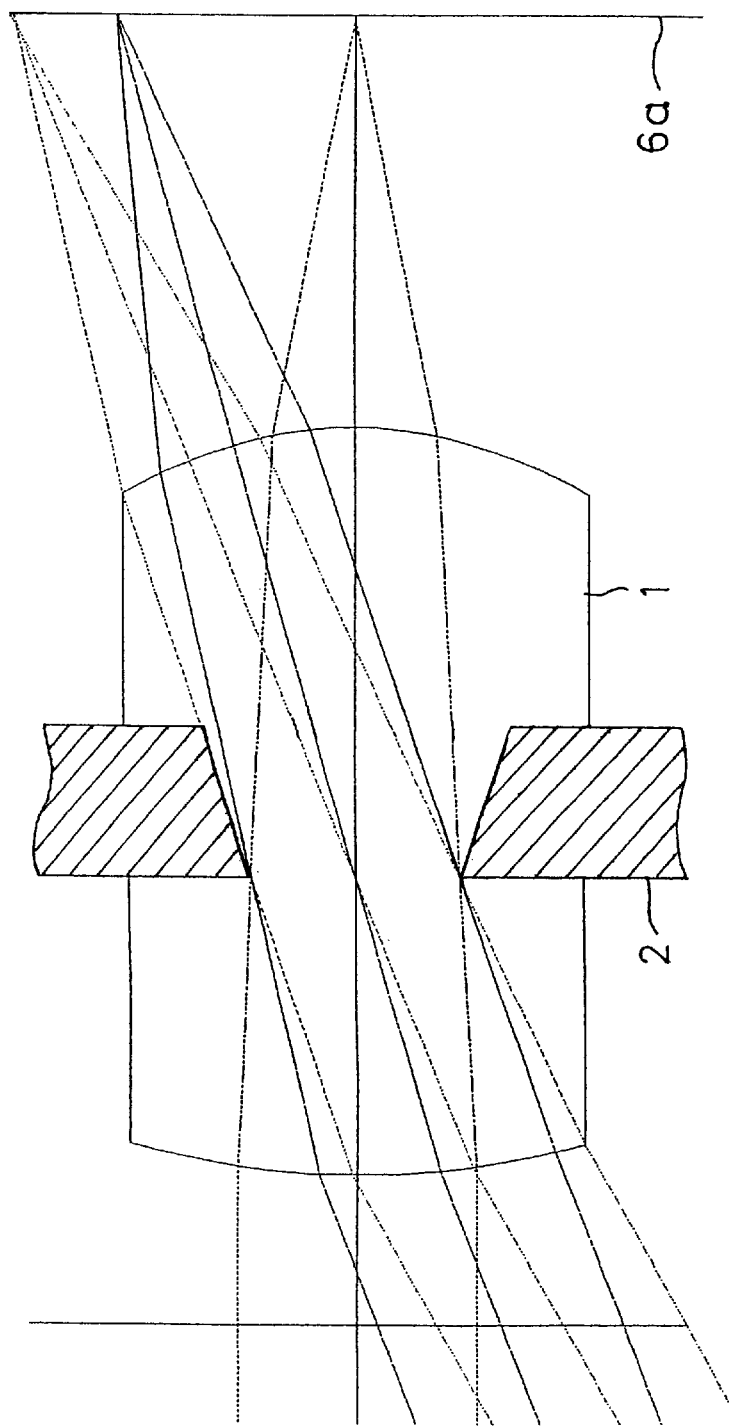
FIG. 13 is a schematic illustration showing Example 2 of an image pickup lens system according to the present invention.

FIG. 13 shows Example 2 of the present invention, which is an image pickup lens system having the lens body 1 including a double convex lens having a positive power, the inner cylindrical surface of the diaphragm 2 has a slope making an acute angle end at a location of the object side portion thereof. The image pickup lens system of Example 2 is set under the following conditions:

| Face | Radius r of curvature | Distance d | Refractive index nd | Abbe number vd |
|---|---|---|---|---|
| (1) Object | 0.000 | ∞ | | |
| (2) First face of lens body | 2.782 | 1.0000 | 1.54300 | 56.0 |
| (3) First face of diaphragm | 0.000 | 0.5000 | 1.54300 | 56.0 |
| (4) Second face of diaphragm | 0.000 | 1.000 | 1.54300 | 56.0 |
| (5) Second face of lens body | −1.224 | 1.3720 | | |
| (6) CCD face | 0.000 | | | |

| Face | K | A | b |
|---|---|---|---|
| 2 | 0.000000e+000 | −2.194640e−003 | −2.504899e−003 |
| 5 | −9.876386e+000 | −2.599212e−001 | 1.395109e−001 |

Under such conditions, the angle of view 2ω = 60 degrees and F number = 2.5 were established, thereby sufficient optical characteristics including a wide angle of view and a very high brightness can be provided.

Under such conditions, the angle of view 2ω=60 degrees and F number=2.5 were established, thereby sufficient optical characteristics including a wide angle of view and a very high brightness can be provided.

Example 3

Figure 14:
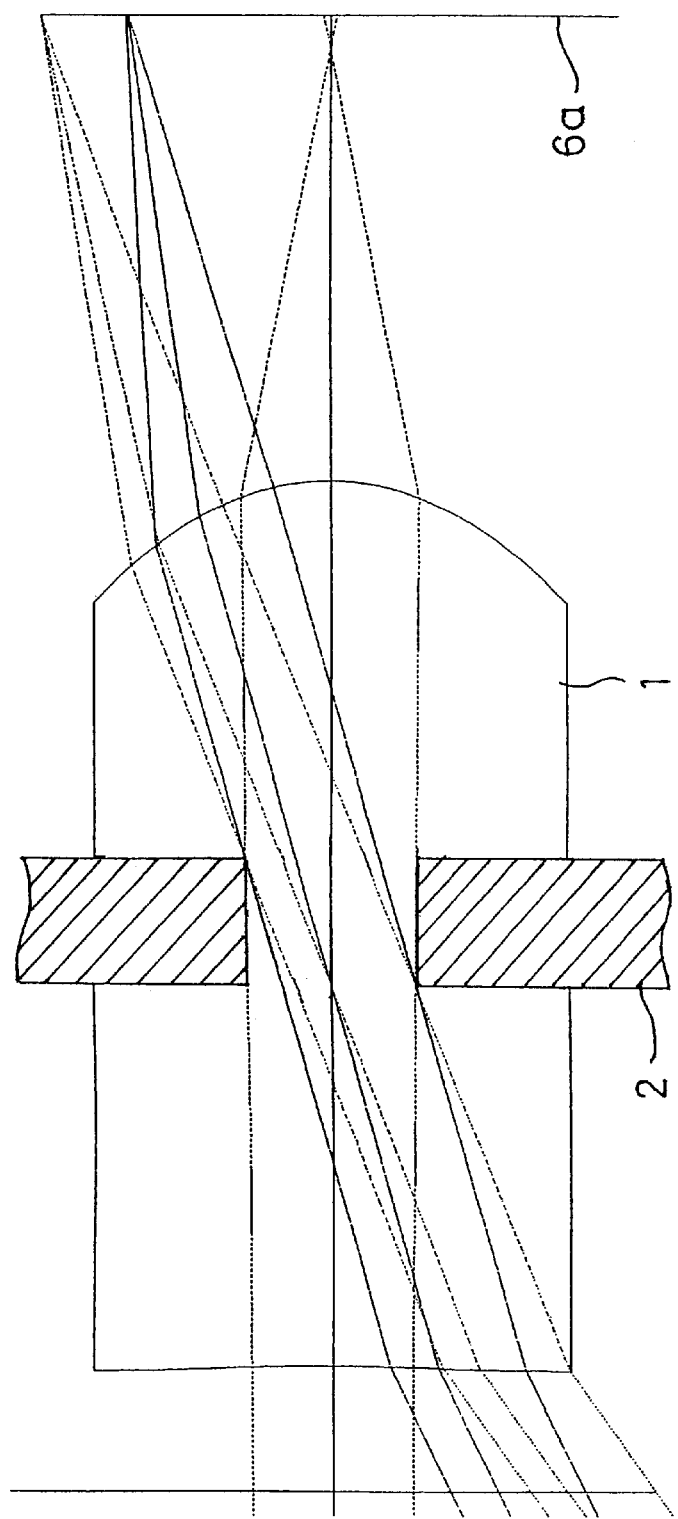
FIG. 14 is a schematic illustration showing Example 3 of an image pickup lens system according to the present invention.

FIG. 14 shows Example 3 of the present invention, which is an image pickup lens system having the lens body 1 including a meniscus concave lens having a positive power and one concave face at a location of the object side portion, the cylindrical inner surface of the diaphragm 2 runs parallel with the optic axis. The image pickup lens system of Example 3 is set under the following conditions:

| Face | Radius r of curvature | Distance d | Refractive index nd | Abbe number vd |
|---|---|---|---|---|
| (1) object | 0.000 | ∞ | | |
| (2) First face of lens body | −8.633 | 1.5000 | 1.54300 | 56.0 |
| (3) First face of diaphragm | 0.000 | 0.5000 | 1.54300 | 56.0 |
| (4) Second face of diaphragm | 0.000 | 1.5000 | 1.54300 | 56.0 |
| (5) Second face of lens body | −0.905 | 1.8358 | | |
| (6) CCD face | 0.000 | | | |

| Face | K | A | B |
|---|---|---|---|
| 2 | 0.000000e+000 | 5.474060e−002 | −1.815804e−002 |
| 5 | −3.116156e+000 | −2.163490e−001 | 5.074567e−002 |

Under such conditions, the angle of view 2ω = 71 degrees and F number = 2.5 were established, thereby sufficient optical characteristics including a wide angle of view and a very high brightness can be provided.

Under such conditions, the angle of view 2ω=71 degrees and F number=2.5 were established, thereby sufficient optical characteristics including a wide angle of view and a very high brightness can be provided.

Under the Examples 1 to 3, the distance d between the object and the first face of the lens body 1 was unlimited, however, the present invention can be applied to the image pickup lens system having a limited distance d.

Although the embodiments of the present invention have been described in detail, it will be understood that the present invention is not limited to the above-described embodiments, and various modifications in design may be made without departing from the spirit and scope of the invention defined in claims.

What is claimed is:

1. An image pickup lens system comprising a lens body having a positive power and a diaphragm which is unified with the lens body at a location between a first face and a second face of the lens body and of which an inner cylindrical surface is disposed at a location of an inside an outer circumference of the diaphragm projects outward beyond an outer cylindrical surface of the lens body.

2. An image pickup lens system comprising a lens body having a positive power and a diaphragm which is unified with the lens body at a location between a first face and a second face of the lens body and of which an inner cylindrical surface is disposed at a location of an inside of the lens body and wherein said diaphragm is unified with a lens barrel.

3. An image pickup lens system according to claim 1 or claim 2, wherein said inner cylindrical surface of the diaphragm has an acute angle end at a location of the first face side portion or the second face side portion of the lens body.

4. An image pickup lens system according to claim 1 or claim 2, wherein said diaphragm is made of a material which has a similar or almost the same heat conductivity of the one of a molding die for molding the lens body.

5. An image pickup lens system according to claim 1 or 2, wherein said diaphragm has a light shade which extends from diaphragm to the first face of the lens body along the outer cylindrical surface of the lens body.

6. An image pickup lens system according to claim 3, wherein said diaphragm is made of a material which has a similar or almost the same heat conductivity of the one of a molding die for molding the lens body.

7. An image pickup lens system according to claim 3, wherein said diaphragm has a light shade which extends from diaphragm to the first face of the lens body along the outer cylindrical surface of the lens body.

8. An image pickup lens system according to claim 4, wherein said diaphragm has a light shade which extends from diaphragm to the first face of the lens body along the outer cylindrical surface of the lens body.

9. An image pickup lens system according to claim 6, wherein said diaphragm has a light shade which extends from diaphragm to the first face of the lens body along the outer cylindrical surface of the lens body.

10. An image pickup lens system comprising a lens body having a positive power and a diaphragm which is unified with the lens body at a location between a first face and a second face of the lens body and of which an inner cylindrical surface is disposed at a location of an inside of the lens body, wherein said inner cylindrical surface of the diaphragm has an acute angle end at a location of the fast face side portion or the second face side portion of the lens body.

11. An image pickup lens system comprising a lens body having a positive power and a diaphragm which is unified with the lens body at a location between a fast face and a second face of the lens body and of which an inner cylindrical surface is disposed at a location of an inside of the lens body, wherein said diaphragm is made of a material which has a similar or almost the same heat conductivity as a heat conductivity of a molding die for molding the lens body.

* * * * *